(12) United States Patent
Kromer et al.

(10) Patent No.: US 9,903,328 B2
(45) Date of Patent: Feb. 27, 2018

(54) SOLENOID VALVE WITH IMPROVED OPENING AND CLOSING BEHAVIOR

(71) Applicant: Robert Bosch GmbH, Stuttgart (DE)

(72) Inventors: Ralf Kromer, Vaihingen (DE); Michael Knorpp, Weissach (DE)

(73) Assignee: ROBERT BOSCH GMBH, Stuttgart (DE)

( * ) Notice: Subject to any disclaimer, the term of this patent is extended or adjusted under 35 U.S.C. 154(b) by 0 days.

(21) Appl. No.: 14/762,346

(22) PCT Filed: Feb. 18, 2014

(86) PCT No.: PCT/EP2014/053110
§ 371 (c)(1),
(2) Date: Jul. 21, 2015

(87) PCT Pub. No.: WO2014/170049
PCT Pub. Date: Oct. 23, 2014

(65) Prior Publication Data
US 2016/0025051 A1  Jan. 28, 2016

(30) Foreign Application Priority Data

Apr. 17, 2013  (DE) .................. 10 2013 206 958

(51) Int. Cl.
*F16K 31/06* (2006.01)
*F02M 51/06* (2006.01)
(Continued)

(52) U.S. Cl.
CPC .... *F02M 51/0614* (2013.01); *F02M 51/0664* (2013.01); *F02M 61/166* (2013.01);
(Continued)

(58) Field of Classification Search
CPC .......... F02M 51/0614; F02M 51/0664; F02M 51/0689; F02M 61/166; F02M 2200/02;
(Continued)

(56) References Cited

U.S. PATENT DOCUMENTS 5,029,807 A * 7/1991 Fuchs ................... F16K 31/082
251/129.18
5,375,811 A * 12/1994 Reinicke ............... F16K 31/082
137/550
(Continued)

FOREIGN PATENT DOCUMENTS

CN  102150223 A  8/2011
CN  102770925 A  11/2012
(Continued)

OTHER PUBLICATIONS

International Search Report for PCT/EP2014/053110, dated Apr. 23, 2014.

*Primary Examiner* — Ian Paquette
(74) *Attorney, Agent, or Firm* — Norton Rose Fulbright US LLP; Gerard Messina

(57) ABSTRACT

A solenoid valve for controlling fluids includes a closing element that opens and closes at least one outlet opening on a valve seat, and a magnetic circuit that includes an armature, an internal pole, a magnetic return path, and a coil, the armature being connected to the closing element. The magnetic circuit includes a nonmagnetic separating element for interrupting the magnetic circuit and at least one magnetic crosspiece running in a direction of a longitudinal extension of the valve and situated on the nonmagnetic separating element.

19 Claims, 3 Drawing Sheets

(51) Int. Cl.
    *F02M 61/16* (2006.01)
    *H01F 7/08* (2006.01)
    *F16K 1/34* (2006.01)
    *F16K 27/02* (2006.01)
(52) U.S. Cl.
    CPC .............. *F16K 1/34* (2013.01); *F16K 27/029* (2013.01); *F16K 31/0655* (2013.01); *F16K 31/0675* (2013.01); *H01F 7/081* (2013.01); *F02M 2200/02* (2013.01); *F02M 2200/08* (2013.01); *F02M 2200/8046* (2013.01); *F02M 2200/9069* (2013.01); *H01F 2007/085* (2013.01)
(58) Field of Classification Search
    CPC ....... F02M 2200/9069; F02M 2200/08; F02M 2200/8046; F16K 1/34; F16K 31/0655; F16K 31/0675; F16K 31/08; F16K 31/082; F16K 27/029; H01F 7/081; H01F 2007/085
    USPC ......... 251/129.15, 129.16; 239/585.1, 585.2, 239/585.3, 585.4; 335/255, 261, 262, 335/266, 279, 281, 284, 296, 297, 302, 335/303, 306
    See application file for complete search history.

(56) References Cited

U.S. PATENT DOCUMENTS

| | | | |
|---|---|---|---|
| 6,201,461 B1* | 3/2001 | Eichendorf | .......... F02M 51/061 251/129.15 |
| 6,244,526 B1 | 6/2001 | Schuldt et al. | |
| 6,896,209 B2* | 5/2005 | Reiter | ................ F02M 51/0614 239/533.3 |
| 9,401,236 B2* | 7/2016 | Maier | ..................... B22F 3/225 |
| 2012/0199086 A1 | 8/2012 | Hori et al. | |

FOREIGN PATENT DOCUMENTS

| | | |
|---|---|---|
| DE | 2236586 | 2/1974 |
| DE | 19808067 | 9/1999 |
| DE | 102008030748 | 12/2009 |
| DE | 102010038437 | 2/2012 |
| JP | H058152 A | 1/1993 |
| JP | 2002031009 A | 1/2002 |
| JP | 2003166663 A | 6/2003 |
| JP | 2010096285 A | 4/2010 |
| JP | 4871207 B2 | 2/2012 |
| WO | 2006010665 | 2/2006 |

* cited by examiner

SOLENOID VALVE WITH IMPROVED OPENING AND CLOSING BEHAVIOR

FIELD OF THE INVENTION

The present invention relates to a solenoid valve for controlling fluids, particularly fuel, with improved opening behavior and also improved closing behavior, at the same time.

BACKGROUND

Solenoid valves are known as injection valves, for example, from the related art, in different embodiments. Magnetic injection valves, which, in the area of the armature in the housing, include a nonmagnetic separation, i.e., a nonmagnetic region, are able to open faster than valves without such a separation of the magnetic circuit under the same conditions. However, because of the separation of the magnetic circuit, the closing times are worse.

SUMMARY

Example embodiments of the present invention provide a solenoid valve for controlling fluids, with improved opening times and the closing times of the solenoid valve, and producible particularly simply and cost-effectively, so that mass production is possible. This is achieved in that the solenoid valve includes a magnetic circuit with an armature, an internal pole, and a magnetic return path. The magnetic circuit includes a nonmagnetic separating element for interrupting the magnetic circuit, and at least one magnetic crosspiece, which runs in the axial direction of the valve and closes the magnetic circuit at the nonmagnetic separating element. The magnetic crosspiece thus functions as a magnetic bypass situated on the nonmagnetic separating element.

The magnetic crosspiece is preferably situated radially inside the nonmagnetic separating element, and therefore a harder region than the magnetic separating element can be provided also at an inner surface of the nonmagnetic separating element by the positioning of the magnetic crosspiece.

Particularly preferably, the magnetic crosspiece is formed to be in one piece with the magnetic separating element. Particularly preferably, the one-piece component, including the magnetic crosspiece and the nonmagnetic separating element, in this case, is a MIM component (metal injection molding component). Thereby, the magnetic crosspiece can be developed very individually and suitable for use.

In a preferred example embodiment, the magnetic crosspiece is in contact with the internal pole of the magnetic circuit. It is especially preferred if, between the magnetic crosspiece and the internal pole, a force-locking connection, especially a clamping connection, is developed.

According to a further preferred example embodiment of the present invention, the magnetic crosspiece, the nonmagnetic separating element, and a housing part that is a part of the magnetic circuit are developed as a one-piece component. This one-piece component is particularly preferably a MIM component. Further preferred, in this one-piece component, the housing part is made of ferrite, the nonmagnetic separating element is made of austenite, and the magnetic crosspiece is made of martensite. Especially preferred, in this case, the housing part of ferrite is magnetically stronger than the magnetic crosspiece of martensite.

Preferably, a plurality of magnetic crosspieces and the nonmagnetic separating element are provided in the form of a sleeve with a constant inner diameter. Alternatively, the magnetic crosspieces and the nonmagnetic separating element are developed in such a way that they are also provided in the basic form of a sleeve, but that the magnetic crosspieces project radially inwards from the magnetic separating element.

For as rapid as possible a closing time, there is further preferred a cross sectional area of the nonmagnetic separating element that is greater than a cross sectional area of a magnetic choke device.

The solenoid valve, according to example embodiments of the present invention, is used especially preferably as a fuel injection valve, particularly for direct injection into a combustion chamber. In this context, fuel is conveyed through the armature of the valve.

Preferred example embodiments of the present invention are described in detail below, with reference to the accompanying drawings. In the drawings, the same or functionally the same parts in each case denote the same parts.

DETAILED DESCRIPTION

A solenoid valve for controlling a fluid, according to a first example embodiment of the present invention, is described in detail below with reference to FIGS. 1-3.

Figure 1:
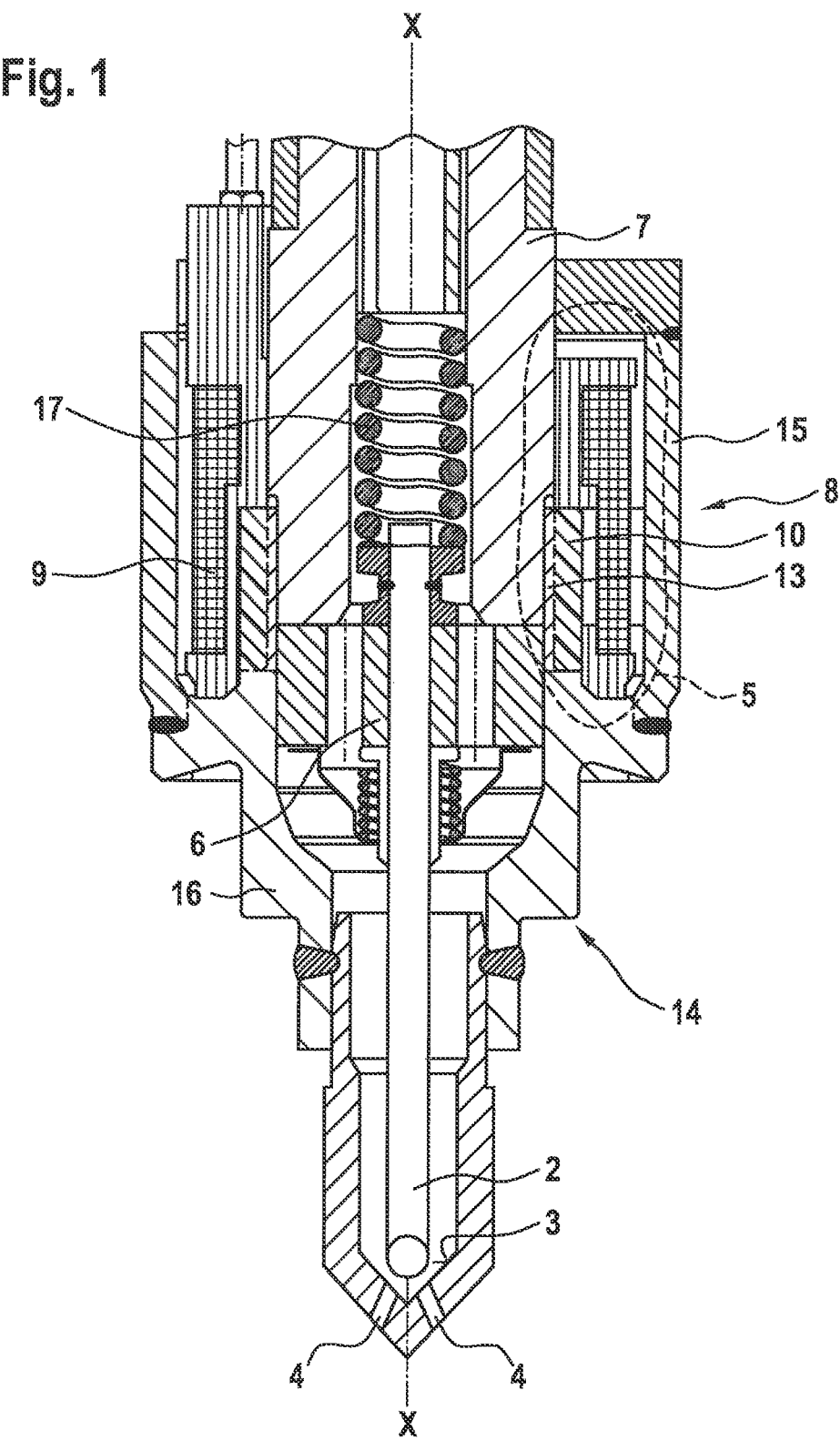
FIG. 1 shows a schematic sectional view of a solenoid valve according to a first example embodiment of the present invention.
Figure 2:
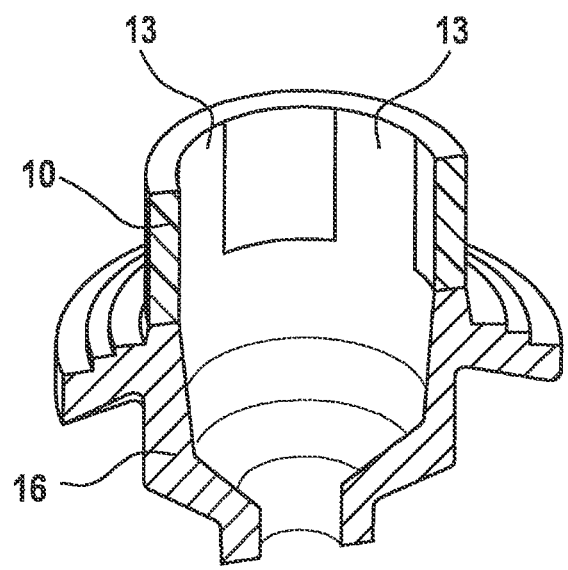
FIG. 2 shows a schematic perspective partial view of a part of a magnetic circuit of the solenoid valve of FIG. 1, according to an example embodiment of the present invention.

In FIG. 1, the solenoid valve includes a closing element 2 in the form of a valve needle with a ball on the closing side, which opens and closes outlet openings 4 on a valve seat 3.

The solenoid valve also includes a magnetic circuit 5 that includes an armature 6, an internal pole 7, and a magnetic return path 8. In this example embodiment, magnetic return path 8 is a part of a housing 14 of the solenoid valve, the housing 14 including a plurality of parts. In this instance, the two housing parts 15, 16 are parts of magnetic circuit 5.

The solenoid valve 1 further includes a coil 9, which attracts armature 6 when current is applied to it. After the supply of current to coil 9 is terminated, a restoring element 17 sets armature 6 back to its initial position. FIG. 1 shows the open state of the solenoid valve, in which armature 6 lies against internal pole 7. Armature 6 is connected in a known manner to closing element 2, in order to effect the lifting motion of the closing element.

Magnetic circuit 5 of the solenoid valve further includes a nonmagnetic separating element 10, which is sleeve-shaped in this example embodiment. Nonmagnetic separating element 10 makes possible a magnetic separation of the magnetic circuit, and ensures that, upon operation of the coil for opening the valve, the magnetic circuit is closed rapidly via armature 6, so that a very rapid opening time of the solenoid valve is achieved. Nonmagnetic separating element 10 is, however, problematic with respect to the closing times of the solenoid valve, which increase because of nonmagnetic separating element 10.

This is why, according to the present invention, a plurality of magnetic crosspieces 13 are provided, which produce a connection between housing part 16 of housing 14 and internal pole 7. These crosspieces 13 provide a magnetic bridging of the nonmagnetic separating element.

In the first example embodiment, altogether four magnetic crosspieces 13 are provided, which are situated on the inside of a nonmagnetic separating element 10. The four crosspieces 13, in this instance, are provided along the inner circumference at the same distance apart. The width of crosspieces 13 in the circumferential direction is the same as an intermediate space between two adjacent crosspieces 13, in this context.

In this example embodiment, nonmagnetic separating element 10 is made of austenite and crosspieces 13 are lightly magnetized and made of martensite. By contrast, housing part 16 is made of ferrite and is magnetically stronger than crosspieces 13. In this case, housing part 16, nonmagnetic separating element 10, and crosspieces 13 form a one-piece component, which is provided as a MIM component. Crosspieces 13, in this case, are situated on sleeve-shaped nonmagnetic separating element 10 such that a cylinder-shaped, smooth, cylindrical inner surface of the component is achieved. Since crosspieces 13 are produced from martensite, they are harder than the nonmagnetic separating element 10.

Figure 3:
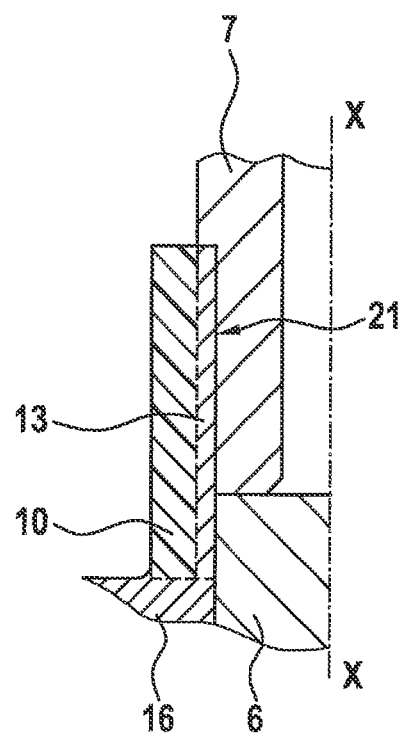
FIG. 3 shows an enlarged sectional view of a subsection of the magnetic circuit of FIG. 1, according to an example embodiment of the present invention.

Furthermore, according to an example embodiment of the present invention, a clamping connection 21 (as shown in FIG. 3) is provided between the one-piece component of the magnetic circuit, including nonmagnetic separating element 10, crosspieces 13, and housing part 16, and internal pole 7.

As is made particularly clear in FIG. 3, magnetic crosspieces 13 are each arranged such that a first section of the respective crosspiece 13 is in contact with internal pole 7 and a second section of the respective crosspiece 13 is in contact with armature 6. Because of that, crosspieces 13 are in addition still able to take over a guidance function for the armature 6. Consequently, a subsection of crosspieces 13 is provided as guidance for armature 6. Since crosspieces 13 are harder than separating element 10, reduced wear thereby comes about.

By introducing crosspieces 13, the magnetic flux is reduced in comparison with a region provided completely at the inner circumference of the component. Thereby, in particular, even more rapid opening times are possible, without a negative effect on the closing times of the valve. Thus, the magnetic crosspieces 13, which are harder compared to nonmagnetic separating element 10, also provide advantages in the guidance of armature 6 and during pressing internal pole 7 into the component. Since crosspieces 13 are only partially present, the magnetic flux is nevertheless significantly reduced, in comparison to a magnetic ring on the inner circumference of the component.

Thus, by providing the magnetic crosspieces 13, running in the axial direction X-X of the valve, a magnetic bridging of nonmagnetic separating element 10 is achieved. This has the effect that the closing times of the solenoid valve significantly improve, without the rapid opening times of the solenoid valve becoming worse. In an example embodiment, a thickness of nonmagnetic separating element 10 is many times greater than the cross section of magnetic crosspieces 13.

Figure 4:
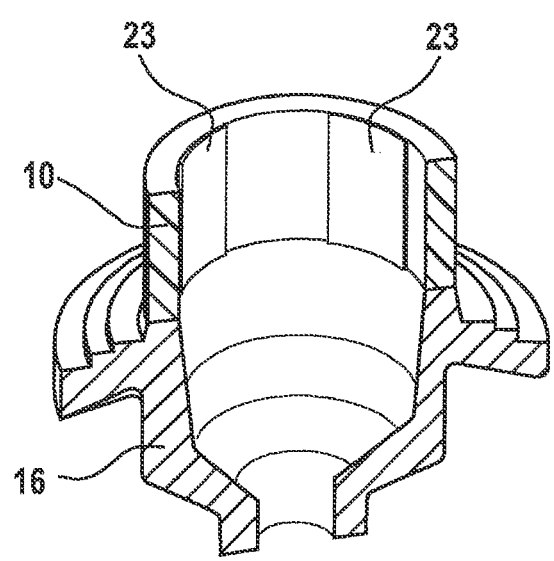
FIG. 4 shows a schematic perspective partial view of a part of a magnetic circuit according to a second example embodiment of the present invention.

FIG. 4 shows the one-piece component of magnetic return path 8 according to a second example embodiment. In FIG. 4, crosspieces 23 provided for nonmagnetic separating element 10 project radially inwards, so that crosspieces 23 are somewhat set off inwards from the internal surface of nonmagnetic separating element 10. This one-piece component is also preferably produced using an MIM method. Crosspieces 23 of this example embodiment preferably project inwards by ca 0.2 mm from the inner circumference of the nonmagnetic separating element 10. A further advantage of the second example embodiment is that the nonmagnetic separating element 10 can be provided as a cylindrical sleeve that can, for instance, also be provided as an insertion part in MIM methods. Thereby, the cylindrical sleeve can be executed very cost-effectively as a geometrically simple component.

What is claimed is:

1. A solenoid valve for controlling fluids, including:
   a closing element configured for opening and closing at least one outlet opening at a valve seat;
   a magnetic circuit including an internal pole, a magnetic return path, and an armature that cooperates with the closing element for effecting a lifting motion of the closing element;
   a coil;
   a nonmagnetic separating element for interrupting the magnetic circuit;
   at least one magnetic crosspiece running in a direction of a longitudinal extension of the valve and situated on the nonmagnetic separating element; and
   a housing part made of a material different than that of the at least one magnetic crosspiece, wherein:
   the at least one magnetic crosspiece produces a connection between the housing part and the internal pole,
   a first section of the magnetic crosspiece is in direct contact with the internal pole,
   a second section of the magnetic crosspiece is in direct contact with the armature, and
   a side of the magnetic crosspiece that faces and is parallel to a longitudinal axis of the solenoid valve includes the first section and the second section.

2. The solenoid valve of claim 1, wherein the at least one magnetic crosspiece is situated radially inside the nonmagnetic separating element.

3. The solenoid valve of claim 1, wherein the at least one magnetic crosspiece is formed in one piece with the nonmagnetic separating element.

4. The solenoid valve of claim 1, wherein the at least one magnetic crosspiece is in contact with the armature and forms a guidance for the armature.

5. The solenoid valve of claim 1, wherein the at least one magnetic crosspiece is in contact with the internal pole.

6. The solenoid valve of claim 1, wherein the at least one magnetic crosspiece includes a plurality of magnetic crosspieces, and the plurality of magnetic crosspieces and the nonmagnetic separating element are shaped as a cylindrical sleeve with a constant inner diameter.

7. The solenoid valve of claim 1, wherein there is a force-locking connection between the magnetic crosspiece and the internal pole.

8. The solenoid valve of claim 7, wherein the force-locking connection is a clamping connection.

9. A solenoid valve for controlling fluids, including:
   a closing element configured for opening and closing at least one outlet opening at a valve seat;

a magnetic circuit including an internal pole, a magnetic return path, and an armature that cooperates with the closing element for effecting a lifting motion of the closing element;
a coil;
a nonmagnetic separating element for interrupting the magnetic circuit;
at least one magnetic crosspiece running in a direction of a longitudinal extension of the valve and situated on the nonmagnetic separating element; and
a housing part made of a material different than that of the at least one magnetic crosspiece, wherein the at least one magnetic crosspiece produces a connection between the housing part and the internal pole, wherein the at least one magnetic crosspiece is formed in one piece with the nonmagnetic separating element, wherein the at least one magnetic crosspiece, the nonmagnetic separating element, and the housing part, which is a part of the magnetic circuit, are provided as a one-piece component.

10. The solenoid valve of claim 9, wherein the one-piece component is a Metal Injection Molding (MIM) component.

11. A solenoid valve for controlling fluids, including:
a closing element configured for opening and closing at least one outlet opening at a valve seat;
a magnetic circuit including an internal pole, a magnetic return path, and an armature that cooperates with the closing element for effecting a lifting motion of the closing element;
a coil;
a nonmagnetic separating element for interrupting the magnetic circuit; and
at least one magnetic crosspiece running in a direction of a longitudinal extension of the valve and situated on the nonmagnetic separating element, wherein the at least one magnetic crosspiece is formed in one piece with the nonmagnetic separating element, wherein the at least one magnetic crosspiece, the nonmagnetic separating element, a housing part, which is a part of the magnetic circuit, are provided as a one-piece component, and wherein the housing part is magnetically stronger than the at least one magnetic crosspiece.

12. A solenoid valve for controlling fluids, including:
a closing element configured for opening and closing at least one outlet opening at a valve seat;
a magnetic circuit including an internal pole, a magnetic return path, and an armature that cooperates with the closing element for effecting a lifting motion of the closing element;
a coil;
a nonmagnetic separating element for interrupting the magnetic circuit; and
at least one magnetic crosspiece running in a direction of a longitudinal extension of the valve and situated on the nonmagnetic separating element, wherein the at least one magnetic crosspiece is formed in one piece with the nonmagnetic separating element, wherein the at least one magnetic crosspiece, the nonmagnetic separating element, a housing part, which is a part of the magnetic circuit, are provided as a one-piece component, and wherein the housing part is made of ferrite, the nonmagnetic separating element is made of austenite, and the at least one magnetic crosspiece is made of martensite.

13. The solenoid valve of claim 12, wherein the housing part is magnetically stronger than the at least one magnetic crosspiece.

14. A solenoid valve for controlling fluids, including:
a closing element configured for opening and closing at least one outlet opening at a valve seat;
a magnetic circuit including an internal pole, a magnetic return path, and an armature that cooperates with the closing element for effecting a lifting motion of the closing element;
a coil;
a nonmagnetic separating element for interrupting the magnetic circuit;
at least one magnetic crosspiece running in a direction of a longitudinal extension of the valve and situated on the nonmagnetic separating element; and
a housing part made of a material different than that of the at least one magnetic crosspiece, wherein the at least one magnetic crosspiece produces a connection between the housing part and the internal pole, wherein the at least one magnetic crosspiece is in contact with the armature and forms a guidance for the armature, wherein the at least one magnetic crosspiece, the nonmagnetic separating element, and the housing part, which is a part of the magnetic circuit, are provided as a one-piece component.

15. The solenoid valve of claim 14, wherein the one-piece component is a Metal Injection Molding (MIM) component.

16. A solenoid valve for controlling fluids, including:
a closing element configured for opening and closing at least one outlet opening at a valve seat;
a magnetic circuit including an internal pole, a magnetic return path, and an armature that cooperates with the closing element for effecting a lifting motion of the closing element;
a coil;
a nonmagnetic separating element for interrupting the magnetic circuit; and
at least one magnetic crosspiece running in a direction of a longitudinal extension of the valve and situated on the nonmagnetic separating element, wherein the at least one magnetic crosspiece is in contact with the armature and forms a guidance for the armature, wherein the at least one magnetic crosspiece, the nonmagnetic separating element, and a housing part, which is a part of the magnetic circuit, are provided as a one-piece component, and wherein the housing part is magnetically stronger than the at least one magnetic crosspiece.

17. A solenoid valve for controlling fluids, including:
a closing element configured for opening and closing at least one outlet opening at a valve seat;
a magnetic circuit including an internal pole, a magnetic return path, and an armature that cooperates with the closing element for effecting a lifting motion of the closing element;
a coil;
a nonmagnetic separating element for interrupting the magnetic circuit; and
at least one magnetic crosspiece running in a direction of a longitudinal extension of the valve and situated on the nonmagnetic separating element, wherein the at least one magnetic crosspiece is in contact with the armature and forms a guidance for the armature, wherein the at least one magnetic crosspiece, the nonmagnetic separating element, and a housing part, which is a part of the magnetic circuit, are provided as a one-piece component, and wherein the housing part is made of ferrite, the nonmagnetic separating element is made of austenite, and the at least one magnetic crosspiece is made of martensite.

18. The solenoid valve of claim 17, wherein the housing part is magnetically stronger than the at least one magnetic crosspiece.

19. A solenoid valve for controlling fluids, including:
- a closing element configured for opening and closing at least one outlet opening at a valve seat;
- a magnetic circuit including an internal pole, a magnetic return path, and an armature that cooperates with the closing element for effecting a lifting motion of the closing element;
- a coil;
- a nonmagnetic separating element for interrupting the magnetic circuit; and
- at least one magnetic crosspiece running in a direction of a longitudinal extension of the valve and situated on the nonmagnetic separating element, wherein the at least one magnetic crosspiece includes a plurality of magnetic crosspieces, the nonmagnetic separating element is cylindrically shaped, and the plurality of magnetic crosspieces project radially inwards from the nonmagnetic separating element.

\* \* \* \* \*